US008707710B2

(12) United States Patent
Somanath et al.

(10) Patent No.: US 8,707,710 B2
(45) Date of Patent: *Apr. 29, 2014

(54) TAILORABLE DESIGN CONFIGURATION TOPOLOGIES FOR AIRCRAFT ENGINE MID-TURBINE FRAMES

(75) Inventors: Nagendra Somanath, South Windsor, CT (US); Keshava B. Kumar, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1258 days.

This patent is subject to a terminal disclaimer.

(21) Appl. No.: 12/562,776

(22) Filed: Sep. 18, 2009

(65) Prior Publication Data

US 2010/0008765 A1 Jan. 14, 2010

Related U.S. Application Data

(62) Division of application No. 11/430,626, filed on May 9, 2006, now Pat. No. 7,610,763.

(51) Int. Cl.
*F02C 7/20* (2006.01)

(52) U.S. Cl.
USPC .......... 60/796

(58) Field of Classification Search
USPC .......... 60/226.1, 781, 796, 798; 415/142, 415/213.1, 215.1; 248/560, 575, 604, 605, 248/614, 618, 621, 637, 638, 676
See application file for complete search history.

(56) References Cited

U.S. PATENT DOCUMENTS

| | | | | |
|---|---|---|---|---|
| 3,312,448 | A | 4/1967 | Hull, Jr. et al. | |
| 4,987,736 | A * | 1/1991 | Ciokajlo et al. | 60/797 |
| 5,307,622 | A | 5/1994 | Ciokajlo et al. | |
| 5,438,756 | A | 8/1995 | Halchak et al. | |
| 6,708,482 | B2 | 3/2004 | Seda | |
| 6,883,303 | B1 | 4/2005 | Seda | |
| 2003/0097844 | A1 * | 5/2003 | Seda | 60/791 |
| 2008/0031727 | A1 | 2/2008 | Sjoqvist | |

FOREIGN PATENT DOCUMENTS

| | | | |
|---|---|---|---|
| EP | 1149986 | A2 | 10/2001 |
| EP | 1340902 | A2 | 9/2003 |
| GB | 2242711 | A | 10/1991 |

OTHER PUBLICATIONS

European Search Report, mailed Jan. 28, 2011.

* cited by examiner

*Primary Examiner* — Phutthiwat Wongwian
(74) *Attorney, Agent, or Firm* — Kinney & Lange, P.A.

(57) ABSTRACT

An expandable mid-turbine frame assembly includes a first bearing cone, a second bearing cone and a mid-turbine frame. The mid-turbine frame assembly connects to a gas turbine engine casing and transfers a first load from a first bearing and a second load from a second bearing towards the engine casing. The first bearing cone transfers the first load from the first bearing. The second bearing cone transfers the second load from the second bearing. The mid-turbine frame is connected to the first and second bearing cones and includes segments. Each segment includes a pre-stressed support for equilibrating the first and second loads.

12 Claims, 7 Drawing Sheets

TAILORABLE DESIGN CONFIGURATION TOPOLOGIES FOR AIRCRAFT ENGINE MID-TURBINE FRAMES

CROSS-REFERENCE TO RELATED APPLICATION(S)

This is a divisional of U.S. application Ser. No. 11/430,626, entitled "TAILORABLE DESIGN CONFIGURATION TOPOLOGIES FOR AIRCRAFT ENGINE MID-TURBINE FRAMES," by N. Somanath et al.

BACKGROUND

The present invention generally relates to the field of gas turbine engines. In particular, the invention relates to a mid-turbine frame for a jet turbine engine.

Turbofans are a type of gas turbine engine commonly used in aircraft, such as jets. The turbofan generally includes a high and a low pressure compressor, a high and a low pressure turbine, a high pressure rotatable shaft, a low pressure rotatable shaft, a fan, and a combuster. The high-pressure compressor (HPC) is connected to the high pressure turbine (HPT) by the high pressure rotatable shaft, together acting as a high pressure system. Likewise, the low pressure compressor (LPC) is connected to the low pressure turbine (LPT) by the low pressure rotatable shaft, together acting as a low pressure system. The low pressure rotatable shaft is housed within the high pressure shaft and is connected to the fan such that the HPC, HPT, LPC, LPT, and high and low pressure shafts are coaxially aligned.

Outside air is drawn into the jet turbine engine by the fan and the HPC, which increases the pressure of the air drawn into the system. The high-pressure air then enters the combuster, which burns fuel and emits the exhaust gases. The HPT directly drives the HPC using the fuel by rotating the high pressure shaft. The LPT uses the exhaust generated in the combuster to turn the low pressure shaft, which powers the fan to continually bring air into the system. The air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to a mid-turbine frame located between the HPT and the LPT by bearing support structures, for example, bearing cones. The mid-turbine frame acts to distribute the load on the bearing support structures by transferring the load from the bearing support structures to the engine casing. Decreasing the weight of the mid-turbine frame can significantly increase the efficiency of the jet turbine engine and the jet itself.

SUMMARY

A mid-turbine frame has a pre-stress design and is connected to an engine casing of a jet turbine engine to distribute a first load from a first bearing and a second load from a second bearing. The mid-turbine frame includes at least one torque box, a first bearing, a second bearing, and at least one strut. The torque box absorbs the first and second loads from the first and second bearings. The first bearing cone connects the first bearing to the torque box and the second bearing cone connects the second bearing to the torque box. The strut connects the torque box to the engine casing.

DETAILED DESCRIPTION

Figure 1:
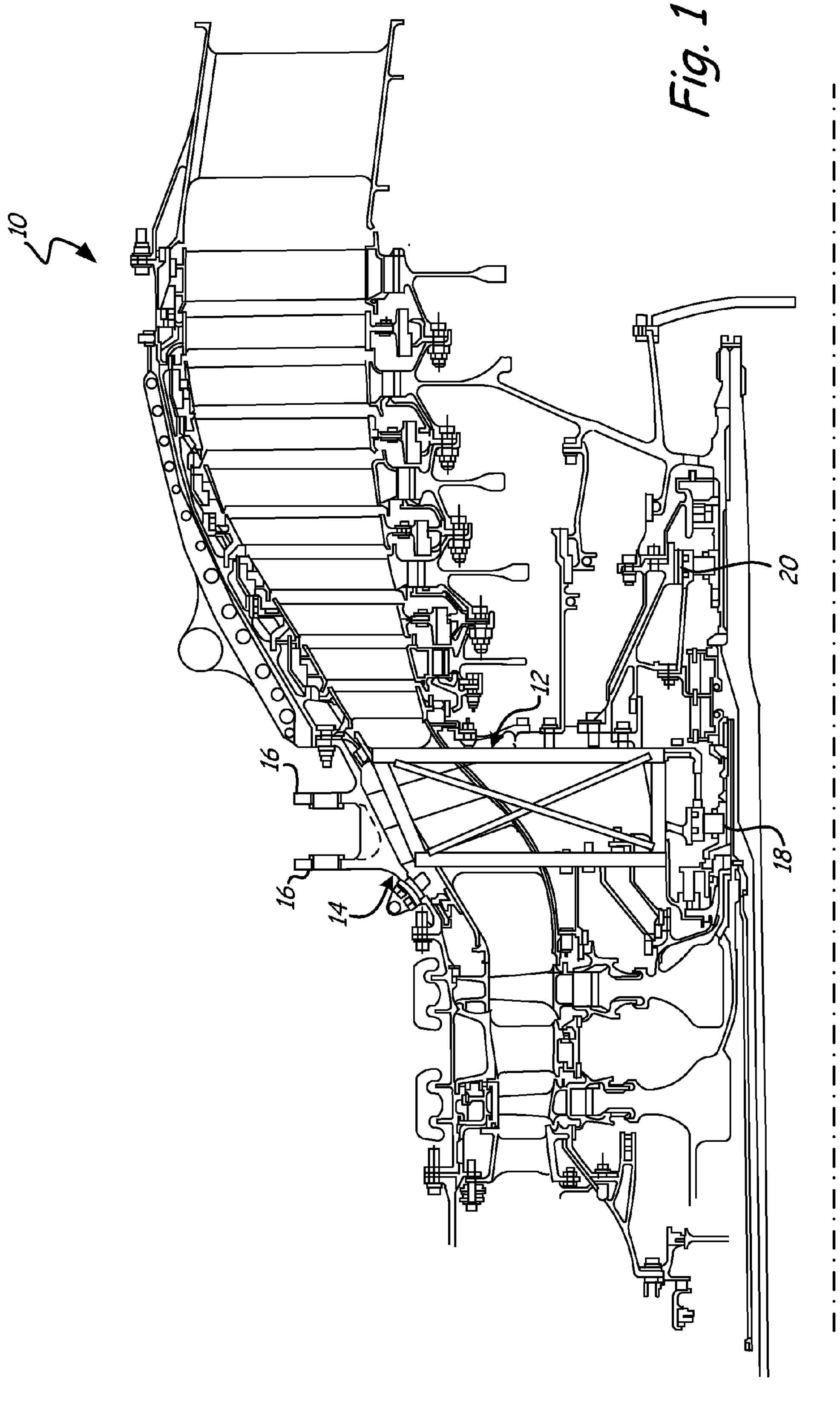
FIG. 1 is a representative sectional view of a gas turbine engine.

FIG. 1 shows a representative sectional view of a gas turbine engine 10 about a gas turbine engine axis centerline. Gas turbine engine 10 generally includes mid-turbine frame 12, engine casing 14, mounts 16, first bearing 18, and second bearing 20. Mid-turbine frame 12 of gas turbine engine 10 has a pre-stress design that allows for expansion of mid-turbine frame 12 upon loading of first and second bearings 18 and 20.

Mid-turbine frame 12 is housed within engine casing 14 of gas turbine engine 10. Mid-turbine frame 12 is connected to first and second bearings 18 and 20 and transfers the load from first and second bearings 18 and 20 to engine casing 14. Engine casing 14 protects mid-turbine frame 12 from its surroundings and transfers the loads from mid-turbine frame 12 to mounts 16. Mid-turbine frame 12 is designed to have a pre-torque that is independent of any applied load from first and second bearings 18 and 20. The pre-torque load is applied to mid-turbine frame 12 during assembly of mid-turbine frame 12 and comes into effect when the loads from first and second bearings 18 and 20 are applied during operation of gas turbine engine 10. The applied load from first and second bearings 18 and 20 are canceled by the pre-torque load of mid-turbine frame 12 as the applied load enters mid-turbine frame 12, bringing mid-turbine frame 12 to equilibrium.

First and second bearings 18 and 20 are located at forward and aft ends of gas turbine engine 10, respectively, below mid-turbine frame 12. First and second bearings 18 and 20 support thrust loads, vertical tension, side gyroscopic loads, as well as vibratory loads from high and low pressure rotors located in gas turbine engine 10. All of the loads supported by first and second bearings 18 and 20 are transferred to engine casing 14 and mounts 16 through mid-turbine frame 12. Second bearing 20 is typically designed to support a greater load than first bearing 18, so mid-turbine frame 12 is designed for stiffness and structural feasibility assuming that second bearing 20 is the extreme situation.

Mid-turbine frame 12 is a segmented structure with a plurality of segments equally spaced circumferentially within gas turbine engine 10. Each segment includes a torque box 22 which is designed to take load from first bearing 18, second bearing 20, and mid-turbine frame 12 and transfer it in a vertical direction toward engine casing 14. In one embodiment, nine segments are positioned approximately forty degrees apart from one another along the circumference of mid-turbine frame 12. In another embodiment, twelve total segments are positioned approximately thirty degrees apart from one another along the circumference of mid-turbine frame 12.

Figure 2:
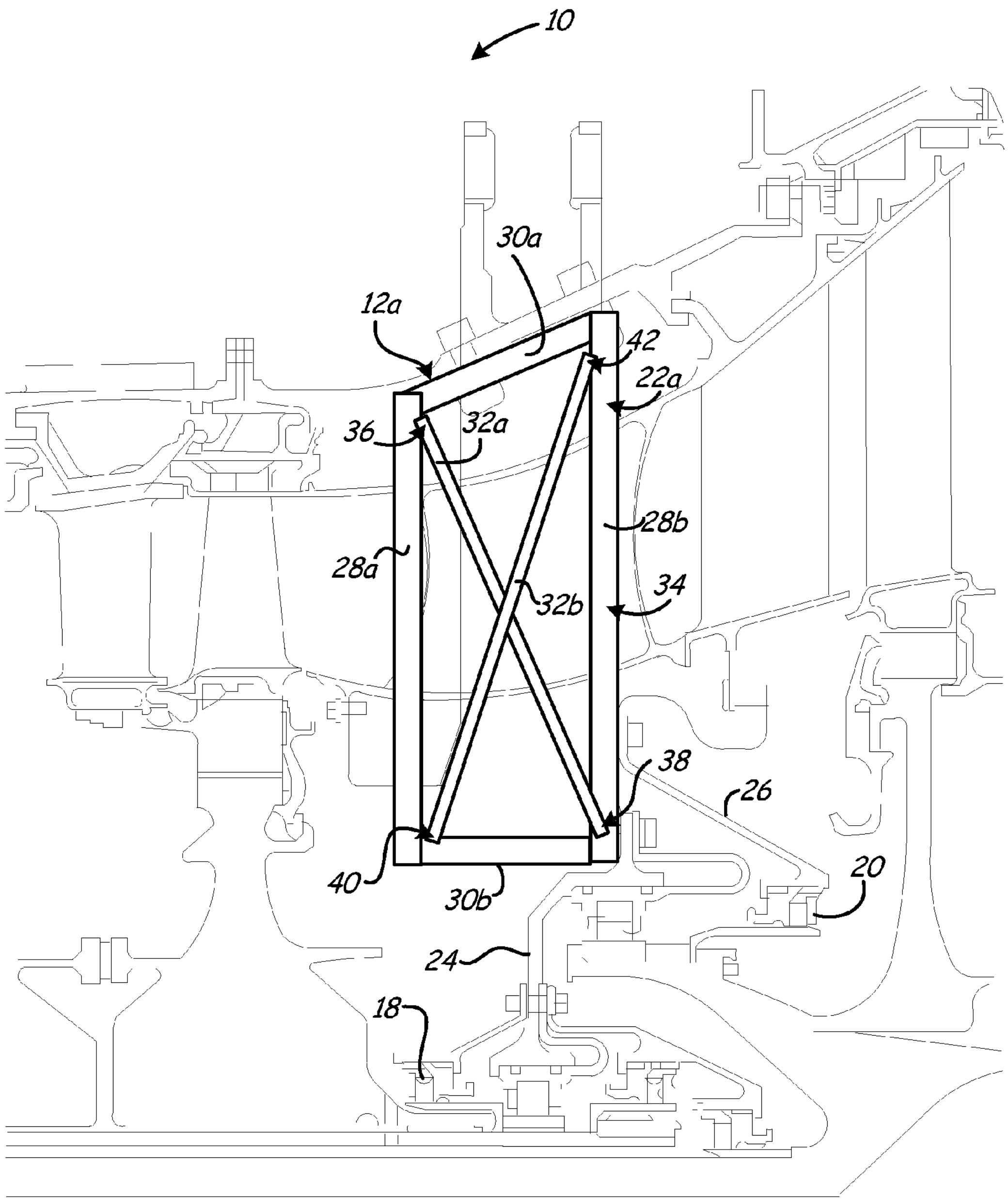
FIG. 2 is a schematic view of a first embodiment of the mid-turbine frame.

FIG. 2 shows a schematic view of a first embodiment of mid-turbine frame 12*a*. For ease of discussion, FIG. 2 will be discussed in reference to one segment of mid-turbine frame 12*a*. First and second bearings 18 and 20 are connected to mid-turbine frame 12 by first and second bearing cones 24 and 26, respectively. Each of first and second bearing cones 24 and 26 are connected to a bearing arrangement that has an inner rotating face that continuously rotates with high and low pressure rotors and transfer the loads from first and second bearings 18 and 20 to mid-turbine frame 12*a*.

Each torque box 22*a* of mid-turbine frame 12*a* generally includes first and second vertical pre-stressed rods 28*a* and 28*b*; first and second horizontal pre-stressed rods 30*a* and 30*b*; and first and second pre-stressed wires 32*a* and 32*b*. Rods 28*a*, 28*b*, 30*a*, and 30*b* are connected to each other at approximately ninety-degree angles to form a primary rectangular frame 34. Mid-turbine frame 12*a* is connected to engine casing 14 and mounts 16 at first horizontal rod 30*a* of primary frame 34. Because rods 28*a*, 28*b*, 30*a*, and 30*b* had a certain amount of torque applied to them during assembly, rods 28*a*, 28*b*, 30*a*, and 30*b* of primary frame 34 cancel a portion of the load entering mid-turbine frame 12*a* from first and second bearings 18 and 20 from first and second bearing cones 24 and 26.

First and second pre-stressed wires 32*a* and 32*b* are connected within primary frame 34 to form an X-shape. First wire 32*a* is connected at a first end 36 proximate the connection of first vertical rod 28*a* and first horizontal rod 30*a* and at a second end 38 proximate the connection of second vertical rod 28*b* and second horizontal rod 30*b*. Second wire 32*b* is connected at a first end 40 proximate the connection of first vertical rod 28*a* and second horizontal rod 30*b* and at a second end 42 proximate the connection of second vertical rod 28*b* and first horizontal rod 30*a*. First and second wires 32*a* and 32*b* act as load fronts or members and absorb any shear load that enters mid-turbine frame 12. Similar to rods 28*a*, 28*b*, 30*a*, and 30*b*, because wires 32*a* and 32*b* had some torque applied to them during assembly, wires 32*a* and 32*b* cancel a portion of the torque from first and second bearings 18 and 20 that enter primary frame 34. Together, rods 28*a*, 28*b*, 30*a*, and 30*b* and first and second wires 32*a* and 32*b* cancel the torque entering mid-turbine frame 12*a* and equilibrate mid-turbine frame 12*a*. In one embodiment, wires 32*a* and 32*b* are shear ties.

Figure 3:
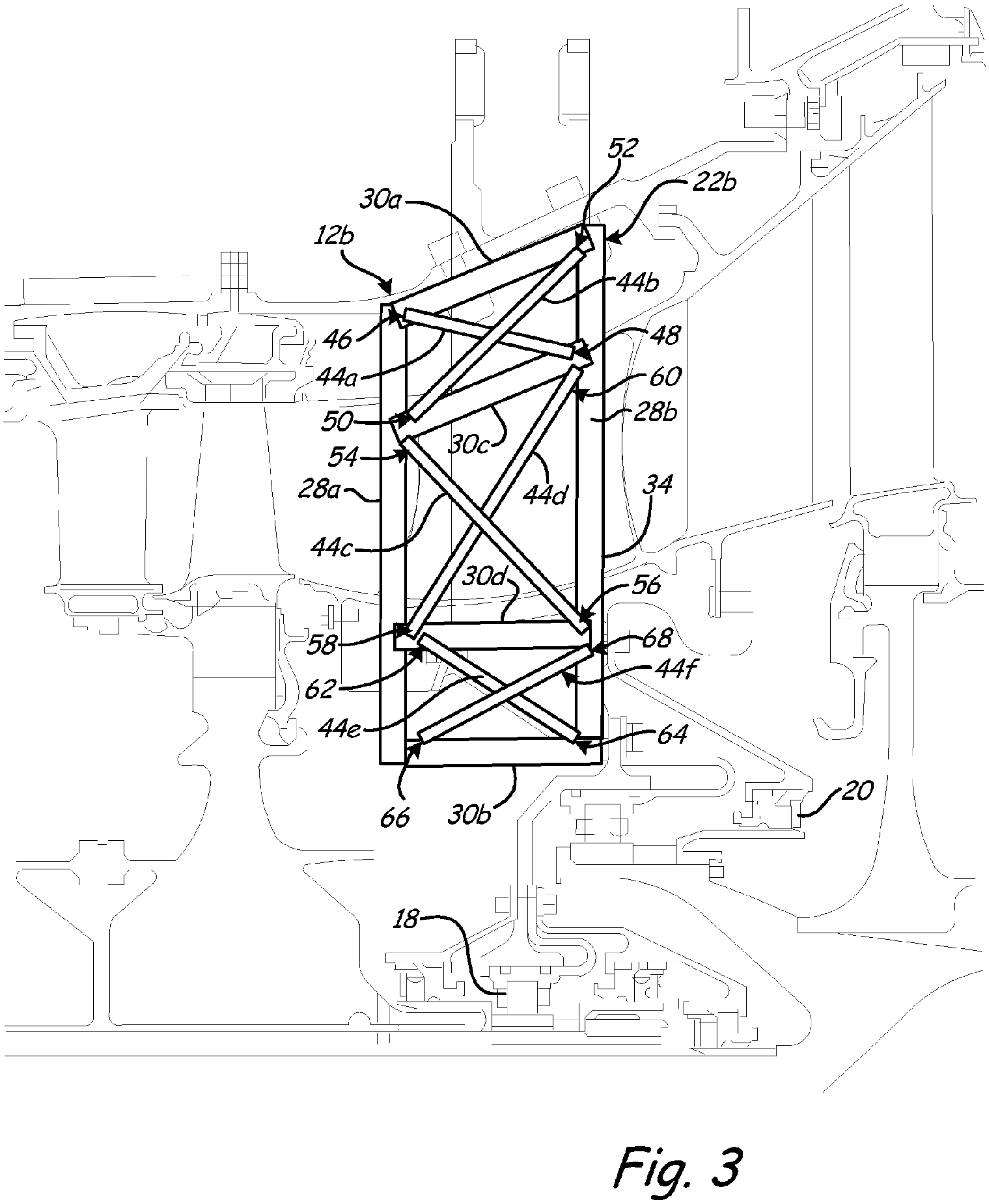
FIG. 3 is a schematic view of a second embodiment of the mid-turbine frame.

FIG. 3 shows a schematic view of a second embodiment of mid-turbine frame 12*b*. During assembly, a pre-torque is applied to mid-turbine frame 12*b* to equilibrate any loads from first and second bearings 18 and 20 and thus functions similarly to mid-turbine frame 12*a*. Similar to FIG. 2, FIG. 3 will be discussed in reference to one segment of mid-turbine frame 12*b*. Each torque box 22*b* of mid-turbine frame 12*b* generally includes first and second vertical pre-stressed rods 28*a* and 28*b*; first, second, third, and fourth horizontal pre-stressed rods 30*a*, 30*b*, 30*c*, and 30*d*; and first, second, third, fourth, fifth, and sixth pre-stressed wires 44*a*, 44*b*, 44*c*, 44*d*, 44*e*, and 44*f*. Torque box 22*b* interacts and functions with first and second bearings 18 and 20 and engine casing 14 in the same manner as torque box 22*a*. Rods 28*a*, 28*b*, 30*a*, and 30*b* of mid-turbine frame 12*b* connect and function in the same manner as rods 28*a*, 28*b*, 30*a*, and 30*b* of mid-turbine frame 12*a* to form primary frame 34. Third and fourth horizontal rods 30*c* and 30*d* are connected to first and second vertical rods 28*a* and 28*b* within primary frame 34 between first and second horizontal rods 30*a* and 30*b*.

First and second wires 44*a* and 44*b* are connected between first and second vertical rods 28*a* and 28*b* and first and third horizontal rods 30*a* and 30*c* to form an X-shape. First wire 44*a* is connected at a first end 46 proximate the connection of first vertical rod 28*a* and first horizontal rod 30*a* and at a second end 48 proximate the connection of second vertical 28*b* and third horizontal rod 30*c*. Second wire 44*b* is connected at a first end 50 proximate the connection of first vertical rod 28*a* and third horizontal rod and 30*c* and at a second end 52 proximate the connection of second vertical rod 28*b* and first horizontal rod 30*a*.

Third and fourth wires 44*c* and 44*d* are connected between first and second vertical rods 28*a* and 28*b* and third and fourth horizontal rods 30*c* and 30*d* to form an X-shape. Third wire 44*c* is connected at a first end 54 proximate the connection of first vertical rod 28*a* and third horizontal rod 30*c* and at a second end 56 proximate the connection of second vertical rod 28*b* and fourth horizontal rod 30*c*. Fourth wire 44*d* is connected at a first end 58 proximate the connection of first vertical rod 28*a* and fourth horizontal rod 30*d* and at a second end 60 proximate the connection of second vertical rod 28*b* and third horizontal rod 30*c*.

Fifth and sixth wires 44*e* and 44*f* are connected between first and second vertical rods 28*a* and 28*b* and fourth and second horizontal rods 30*d* and 30*b* to form an X-shape. Fifth wire 44*e* is connected at a first end 62 proximate the connection of first vertical rod 28*a* and fourth horizontal rod 30*d* and at a second end 64 proximate the connection of second vertical rod 28*b* and second horizontal rod 30*b*. Sixth wire 44*f* is connected at a first end 66 proximate the connection of first vertical rod 28*a* and second horizontal rod 30*b* and at a second end 68 proximate the connection of second vertical rod 28*b* and fourth horizontal rod 30*d*.

Figure 4:
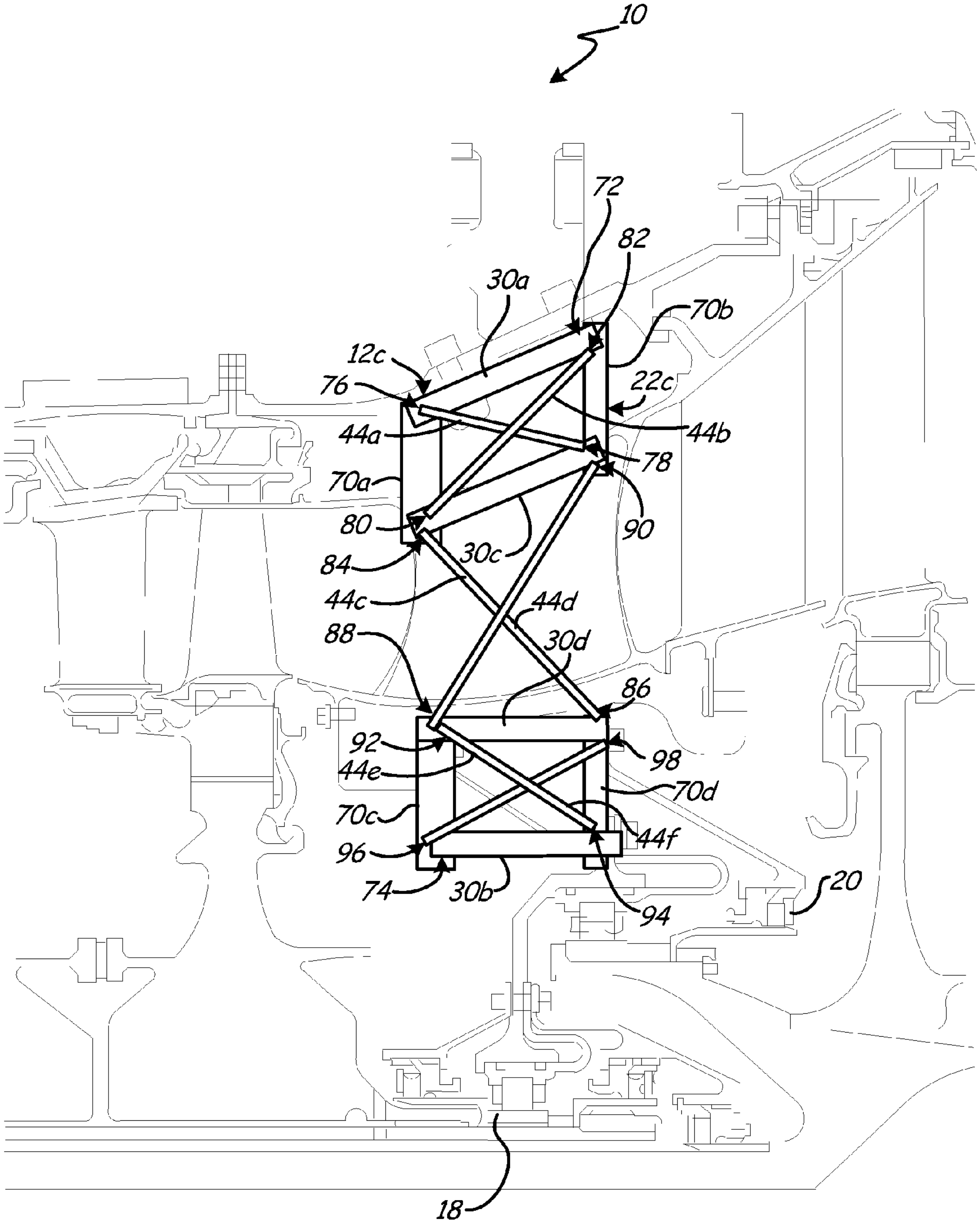
FIG. 4 is a schematic view of a third embodiment of the mid-turbine frame.

FIG. 4 shows a schematic view of a third embodiment of mid-turbine frame 12*c*. During assembly, a pre-torque is applied to mid-turbine frame 12*c* to equilibrate any loads from first and second bearings 18 and 20 and thus functions similarly to mid-turbine frame 12*a*. Similar to FIG. 2, FIG. 4 will be discussed in reference to one segment of mid-turbine frame 12*c*. Each torque box 22*c* of mid-turbine frame 12*c* generally includes first, second, third, and fourth vertical pre-stressed rods 70*a*, 70*b*, 70*c*, and 70*d*; first, second, third, and fourth horizontal pre-stressed rods 30*a*, 30*b*, 30*c*, 30*d*; and first, second, third, fourth, fifth, and sixth pre-stressed wires 44*a*, 44*b*, 44*c*, 44*d*, 44*e*, and 44*f*. Torque box 22*c* interacts and functions with first and second bearings 18 and 20 and engine casing 14 in the same manner as torque box 22*a*. First and second vertical rods 70*a* and 70*b* and first and third horizontal rods 30*a* and 30*c* are connected to each other to form a first rectangular frame 72 and third and fourth vertical rods 70*c* and 70*d* and fourth and second horizontal rods 30*d* and 30*b* are connected to each other at approximately ninety degree angles to form a second rectangular frame 74.

First and second wires 44*a* and 44*b* are connected within first rectangular frame 72 to form an X-shape. First wire 44*a* is connected at a first end 76 proximate the connection of first vertical rod 70*a* and first horizontal rod 30*a* and at a second end 78 proximate the connection of second vertical rod 70*b* and third horizontal rod 30*c*. Second wire 44*b* is connected at a first end 80 proximate the connection of first vertical rod 70*a* and third horizontal rod 30*c* and at a second end 82 proximate the connection of second vertical rod 70*b* and first horizontal rod 30*a*.

Third and fourth wires 44*c* and 44*d* are connected between second and third horizontal rods 30*b* and 30*c* to form an X-shape. Third wire 44*c* is connected at a first end 84 proximate the connection of first vertical rod 70*a* and third horizontal rod 30*c* and at a second end 86 proximate the connection of fourth vertical rod 70*d* and fourth horizontal rod 30*d*. Fourth wire 44*f* is connected at a first end 88 proximate the connection of third vertical rod 70*c* and fourth horizontal rod 30*d* and at a second end 90 proximate the connection of second vertical rod 70*b* and third horizontal rod 30*c*.

Fifth and sixth wires 44*e* and 44*f* are connected within second rectangular frame 76 to form an X-shape. Fifth wire 44*e* is connected at a first end 92 proximate the connection of third vertical rod 70*c* and fourth horizontal rod 30*d* and at a second end 94 proximate the connection of fourth vertical rod 70*d* and second horizontal rod 30*b*. Sixth wire 44*d* is connected at a first end 96 proximate the connection of third vertical rod 70*c* and second horizontal rod 30*b* and at a second end 98 proximate the connection of fourth vertical rod 70*d* and fourth horizontal rod 30*d*.

Figure 5:
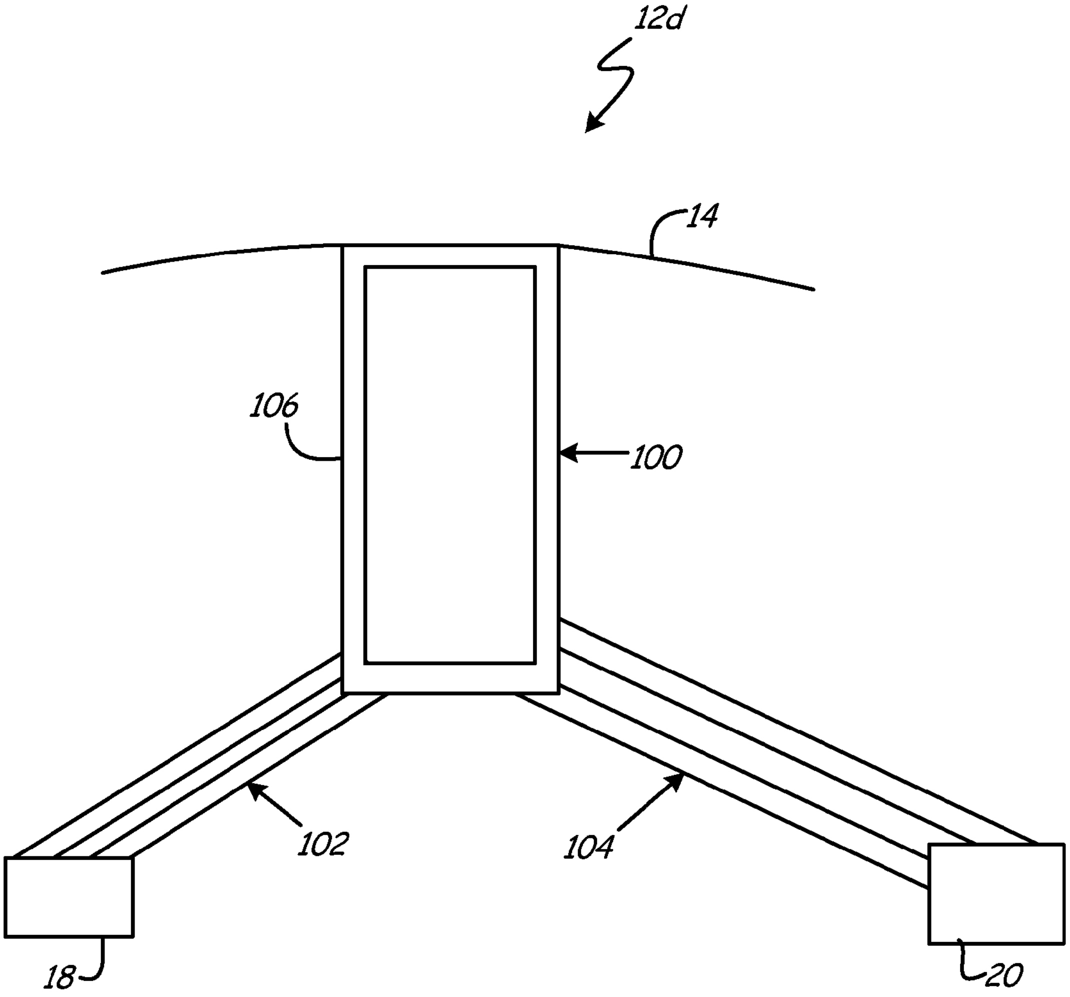
FIG. 5 is a schematic view of a fourth embodiment of the mid-turbine frame.

FIG. 5 shows a schematic view of a fourth embodiment of mid-turbine frame 12*d*. Similar to FIG. 2, FIG. 5 will be discussed in reference to one segment of mid-turbine frame 12*d*. Each segment of mid-turbine frame 12*d* generally includes frame 100, first bearing cone 102, and second bearing cone 104. Frame 100 of mid-turbine frame 12*d* functions to transfer the loads from first and second bearing cones 102 and 104 and as primary torque box 106. Mid-turbine frame 12*d* also has an additional dual torque box design with first and second bearing cones 202 and 204 functioning as secondary torque boxes.

The secondary torque boxes are divided into two parts with first bearing cone 102 taking the load from first bearing 18 and second bearing cone 104 taking the load from second bearing 20. The loads from first bearing 18 are thus transferred to first bearing cone 102 and the loads from second bearing 20 are thus transferred to second bearing cone 104. First and second bearing cones 102 and 104 take the loads from first and second bearings 18 and 20, respectively, and convert the loads to torque, which are subsequently canceled at frame 100 prior to reaching engine casing 14. Torque boxes 102, 104, and 106 interact with each other to balance any load imbalance from first and second bearings 18 and 20.

Figure 6:
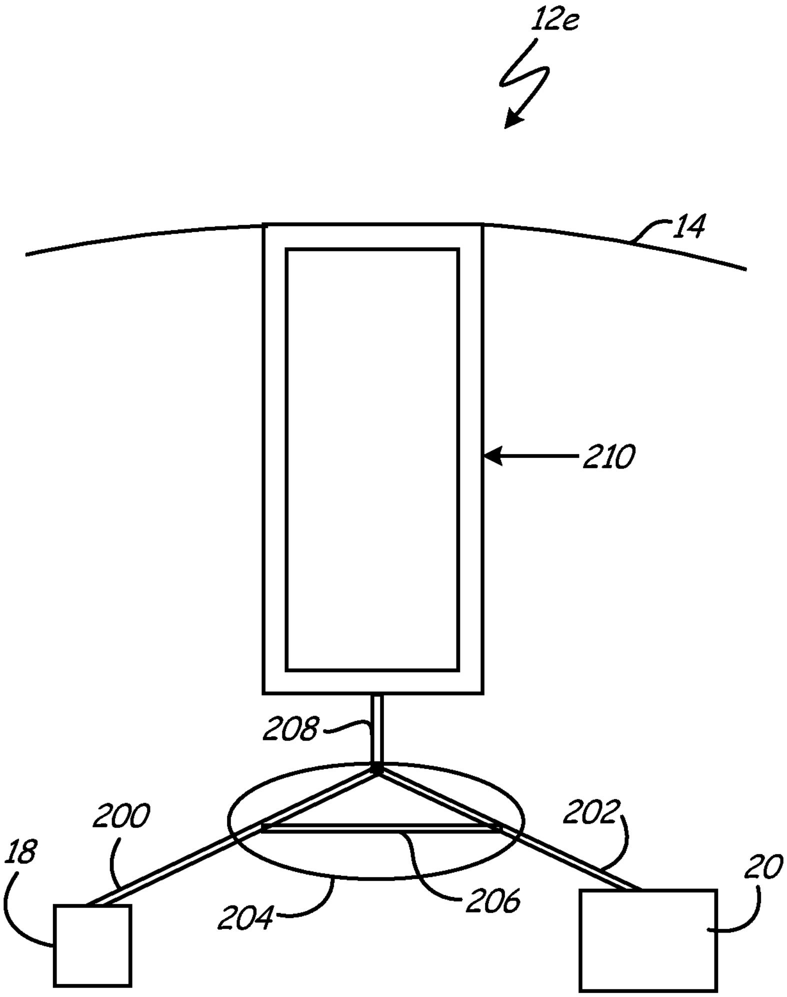
FIG. 6 is a schematic view of a fifth embodiment of the mid-turbine frame.

FIG. 6 shows a schematic view of a fifth embodiment of mid-turbine frame 12*e*. Similar to FIG. 2, FIG. 6 will be discussed in reference to one segment of mid-turbine frame 12*e*. Each segment of mid-turbine frame 12*e* generally includes first bearing cone 200, second bearing cone 202, torque converter 204, spring 206, oleo strut 208, and frame 210. First and second bearings 18 and 20 are connected to first and second bearing cones 200 and 202, respectively, which are attached to torque converter 204 and spring 206. The loads from first and second bearings 18 and 20 are equilibrated at torque converter 204 and spring 206 and are subsequently transmitted to frame 210 through oleo strut 208. Frame 210 connects first and second bearings 18 and 20 to engine casing 14 and mounts 16.

The loads from first and second bearings 18 and 20 travel through first and second bearing cones 200 and 202, respectively, where they meet at torque converter 204, which is formed by the interconnection of first bearing cone 200, second bearing cone 202, and spring 206. Torque converter 204 allows first and second bearing cones 200 and 202 to shift by becoming slack upon load imbalances from first and second bearings 18 and 20. Spring 206 allows the torques from first and second bearing cones 200 and 202 to be balanced such that torque converter 204 cancels all the torques before entering oleo strut 208. This mechanism allows load imbalances caused by eccentric loading or shocks to be easily equilibrated.

When first bearing cone 200 or second bearing cone 202 shifts, oleo strut 208 extends to equilibrate the load from torque converter 204. Oleo strut 208 functions similarly to an elastic band, actuating and deflecting as necessary to help equilibrate any load imbalance from first and second bearings 18 and 20. The eccentric torque from torque converter 204 is then transferred to frame 210, which functions to transfer the loads from first and second bearings 18 and 20 to engine casing 14. The torque transfer from first and second bearings 18 and 20 thus occurs through the interaction of torque converter 204, oleo strut 208, and frame 210 and torque converter 204 and frame 210 cancel the torques from first and second bearings 18 and 20.

Figure 7:
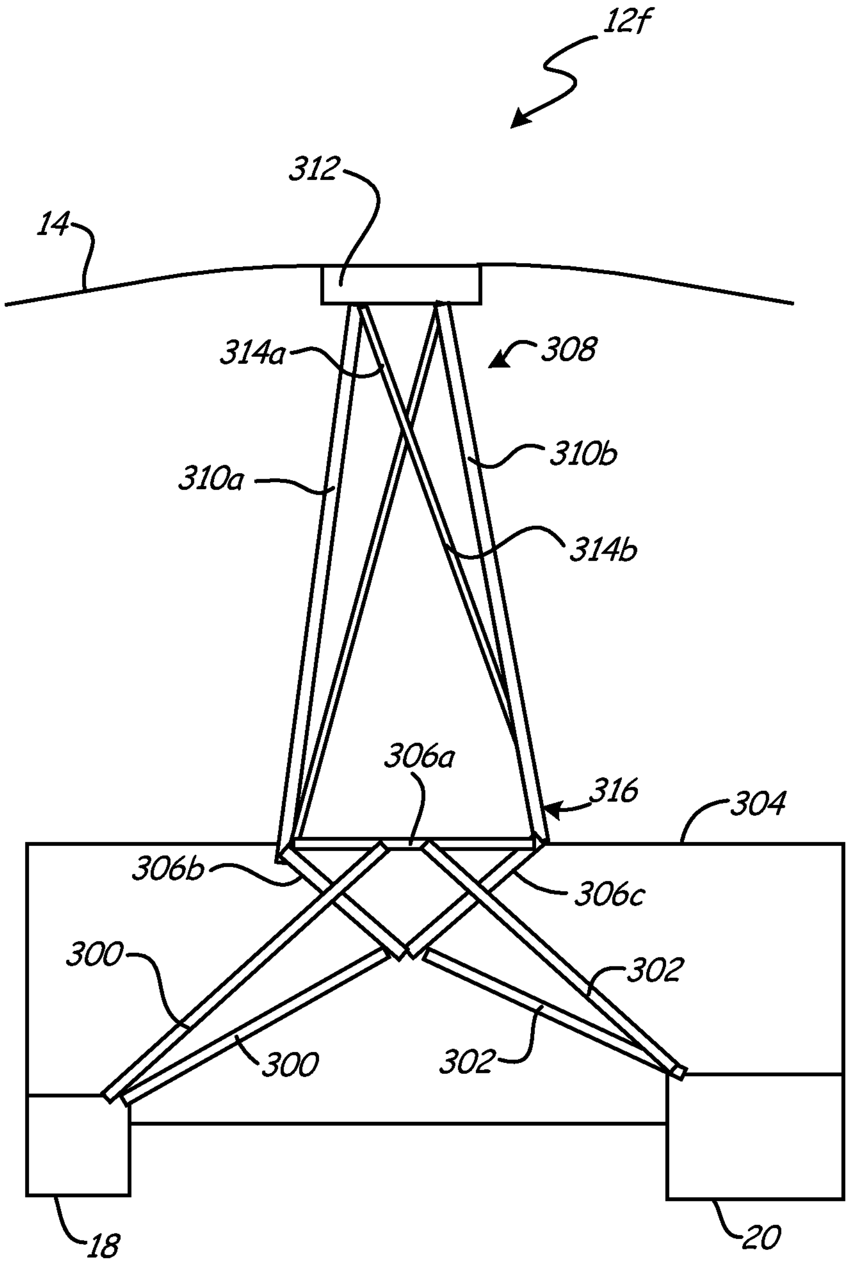
FIG. 7 is a schematic view of a sixth embodiment of the mid-turbine frame.

FIG. 7 shows a schematic view of a sixth embodiment of mid-turbine frame 12*f*. Similar to FIG. 2, FIG. 7 will be discussed in reference to one segment of mid-turbine frame 12*f*. Each segment of mid-turbine frame 12*f* generally includes first bearing cone 300, second bearing cone 302, integrated torque box 304, first, second, and third oleo struts 306*a*, 306*b*, and 306*c* (collectively, oleo struts 306), and stiffened strut 308. First and second bearings 18 and 20 are connected to engine casing 14 through first and second bearing cones 300 and 302, respectively. First and second bearing cones 300 and 302 are then connected to stiffened strut 308 by oleo struts 306.

Integrated torque box 304 includes the connections of first and second bearing cones 300 and 302 to oleo struts 306. Similar to torque converter 204 of mid-turbine frame 12*e*, integrated torque box 304 of mid-turbine frame 12*f* equilibrates the loads from first and second bearing cones 300 and 302. When there is a load imbalance from the loads coming from first and second bearings 18 and 20, integrated torque box 304 equilibrates the loads before the loads are transferred to stiffened strut 308.

First and second bearing cones 300 and 302 are connected to stiffened strut 308 by oleo struts 306. First bearing cone 300 is attached to first and second oleo struts 306*a* and 306*b* and second bearing cone 302 is attached to first and third oleo struts 306*a* and 306*c*. Oleo struts 306 of mid-turbine frame 12*f* act as elastic bands and allow first and second bearing cones 300 and 302 to shift due to eccentric loading or shock. When first or second bearing cones 300 and 302 shifts, oleo struts 306 extend and compensate for the load imbalance, bringing mid-turbine frame 12*f* back to equilibrium prior to transferring the loads to stiffened strut 308.

Stiffened strut 308 generally includes first and second vertical pre-stressed rods 310*a* and 310*b*, vertical rod 312 attached to engine casing 14, and first and second pre-stressed wires 314*a* and 314*b*. First and second vertical rods 310*a* and 310*b* are connected between vertical rod 312 and first oleo strut 306*a*, forming frame 316. First and second wires 314*a* and 314*b* are positioned within frame 3416 to form an X-shape. First and second wires 314*a* and 314*b* are positioned within frame 316 to act as stiffeners for stiffened strut 308 and to prevent first and second rods 310*a* and 310*b* from collapsing on each other. First and second wires 314*a* and 314*b* also transfer the shear loads from first and second bearings 18 and 20, if any, to first and second rods 310*a* and 310*b* and utilizes them by balancing them either at the top or the bottom of first and second rods 310*a* and 310*b*. First and second wires 314*a* and 314*b* thus perform a structural as well as a load transfer function. In one embodiment, first and second wires 314*a* and 314*b* are shear ties.

The mid-turbine frame of the present invention transfers the loads from a first bearing and a second bearing to an engine casing surrounding the mid-turbine frame. In a first set of configurations as illustrated in FIGS. 2-4, the mid-turbine frame has a pre-stress design that includes a plurality of pre-stressed rods and wires that cancel any applied load from the first and second bearings. The pre-torque design of the first embodiment of the mid-turbine frame is independent of any applied load from the first and second bearings and comes into effect when the loads from the first and second bearings are applied during operation of the gas turbine engine. The applied loads from the first and second bearings are canceled by the pre-torque load of the mid-turbine frame as the applied loads enter the mid-turbine frame, bringing the mid-turbine frame to equilibrium.

In a second set of configurations as illustrated in FIGS. 5-7, the mid-turbine frame includes various torque box designs. The torque box designs include a dual torque box design, a torque converter, and an integrated torque box. The second embodiment of the mid-turbine frame allows for the expansion of a first bearing cone and a second bearing cone that connect the first bearing and second bearing to the torque box. The torque box designs allow for the expansion of the mid-turbine frame to counteract any eccentric loading or shocks by compensating for any load imbalances from the first and second bearings.

Although the present invention has been described with reference to preferred embodiments, workers skilled in the art will recognize that changes may be made in form and detail without departing from the spirit and scope of the invention.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An expandable mid-turbine frame assembly for transferring a first load from a first bearing and a second load from a second bearing towards a gas turbine engine casing, the mid-turbine frame assembly comprising:
- a first bearing cone connected to the first bearing for transferring the first load from the first bearing;
- a second bearing cone connected to the second bearing for transferring the second load from the second bearing; and
- a mid-turbine frame connected to the first and second bearing cones, the mid-turbine frame comprising a plurality of segments, each segment comprising a pre-stressed support for equilibrating the first and second loads, the pre-stressed support of each segment comprising:
  - pre-stressed rods positioned to form a frame; and
  - pre-stressed wires positioned within the frame.

2. The mid-turbine frame assembly of claim 1, wherein the pre-stressed wires are shear ties.

3. The mid-turbine frame assembly of claim 1, wherein the pre-stressed wires form an X-shape within the frame.

4. The mid-turbine frame assembly of claim 1, wherein the pre-stressed wires form more than one X-shape within the frame.

5. The mid-turbine frame assembly of claim 4, wherein the pre-stressed rods form more than one frame and the pre-stressed wires form X-shapes within the frames.

6. The mid-turbine frame assembly of claim 1, wherein the pre-stressed support expands to compensate for load imbalances from the first and second bearings.

7. An expandable mid-turbine frame assembly for transferring a first load from a first bearing and a second load from a second bearing towards a gas turbine engine casing, the mid-turbine frame assembly comprising:
- a first bearing cone connected to the first bearing for transferring the first load from the first bearing;
- a second bearing cone connected to the second bearing for transferring the second load from the second bearing; and
- torque boxes having pre-stressed supports for equilibrating the first and second loads, the toque boxes connected to the first bearing by the first bearing cone and connected to the second bearing by the second bearing cone, wherein the pre-stressed supports comprise:
  - pre-stressed rods positioned to form a frame; and
  - pre-stressed wires positioned within the frame.

8. The mid-turbine frame assembly of claim 7, wherein the pre-stressed wires are shear ties.

9. The mid-turbine frame assembly of claim 7, wherein the pre-stressed wires form an X-shape within the frame.

10. The mid-turbine frame assembly of claim 7, wherein the pre-stressed wires form more than one X-shape within the frame.

11. The mid-turbine frame assembly of claim 10, wherein the pre-stressed rods form more than one frame and the pre-stressed wires form X-shapes within the frames.

12. The mid-turbine frame assembly of claim 7, wherein the pre-stressed support expands to compensate for load imbalances from the first and second bearings.

* * * * *